United States Patent [19]

Himono et al.

[11] Patent Number: 4,695,124
[45] Date of Patent: Sep. 22, 1987

[54] PLASTIC OPTICAL FIBER CABLE WITH FERRULE

[75] Inventors: Yusaku Himono; Yoshiaki Moriya; Masato Miyahara; Kazuhiro Suzuki, all of Tokyo, Japan

[73] Assignee: The Furukawa Electric Co., Ltd., Tokyo, Japan

[21] Appl. No.: 696,508

[22] Filed: Jan. 30, 1985

[30] Foreign Application Priority Data

Jan. 30, 1984 [JP] Japan ............................... 59-11546[U]
Mar. 9, 1984 [JP] Japan ............................... 59-33725[U]
Nov. 1, 1984 [JP] Japan ............................... 59-166048[U]
Dec. 25, 1984 [JP] Japan ............................... 59-278490

[51] Int. Cl.⁴ .............................................. G02B 6/36
[52] U.S. Cl. ............................................... 350/96.20
[58] Field of Search ................ 350/96.20, 96.21, 96.22

[56] References Cited

U.S. PATENT DOCUMENTS

| 4,135,781 | 1/1979 | Archer | 350/96.20 |
| 4,191,447 | 3/1980 | Borsuk | 350/96.20 |
| 4,368,948 | 1/1983 | Despouys | 350/96.20 |
| 4,461,537 | 7/1984 | Raymer, II et al. | 350/96.20 |

FOREIGN PATENT DOCUMENTS

| 2421395 | 10/1979 | France | 350/96.20 |
| 55-22707 | 2/1980 | Japan | 350/96.20 |

Primary Examiner—John Lee
Attorney, Agent, or Firm—Schwartz, Jeffery, Schwaab, Mack, Blumenthal & Evans

[57] ABSTRACT

A plastic optical fiber cable with a ferrule in which a plastic sheath of the end side of the optical fiber cable is removed to expose a plastic optical fiber from the end of the optical fiber cable, and the ferrule is secured to the outer periphery of the end side of the optical fiber cable, wherein the ferrule is axially formed as a combination of a plastic cylindrical member for forming the end of the ferrule, and a metal cylindrical member for forming the base end, wherein the plastic cylindrical member is in contact with the enlarged part of the end of the optical fiber core at the inner peripheral surface of the end side to be secured to the end of the optical fiber core, and the metal cylindrical member is contacted under pressure with the outer periphery of the end of the plastic sheath by a stopper projecting from the inner peripheral surface of the metal cylindrical member so as to be fastened to the plastic sheath. Thus, the rigid ferrule can be mounted at the end of the plastic optical fiber cable in a short time and does not damage the core even if a heating cycle is applied thereto.

16 Claims, 11 Drawing Figures

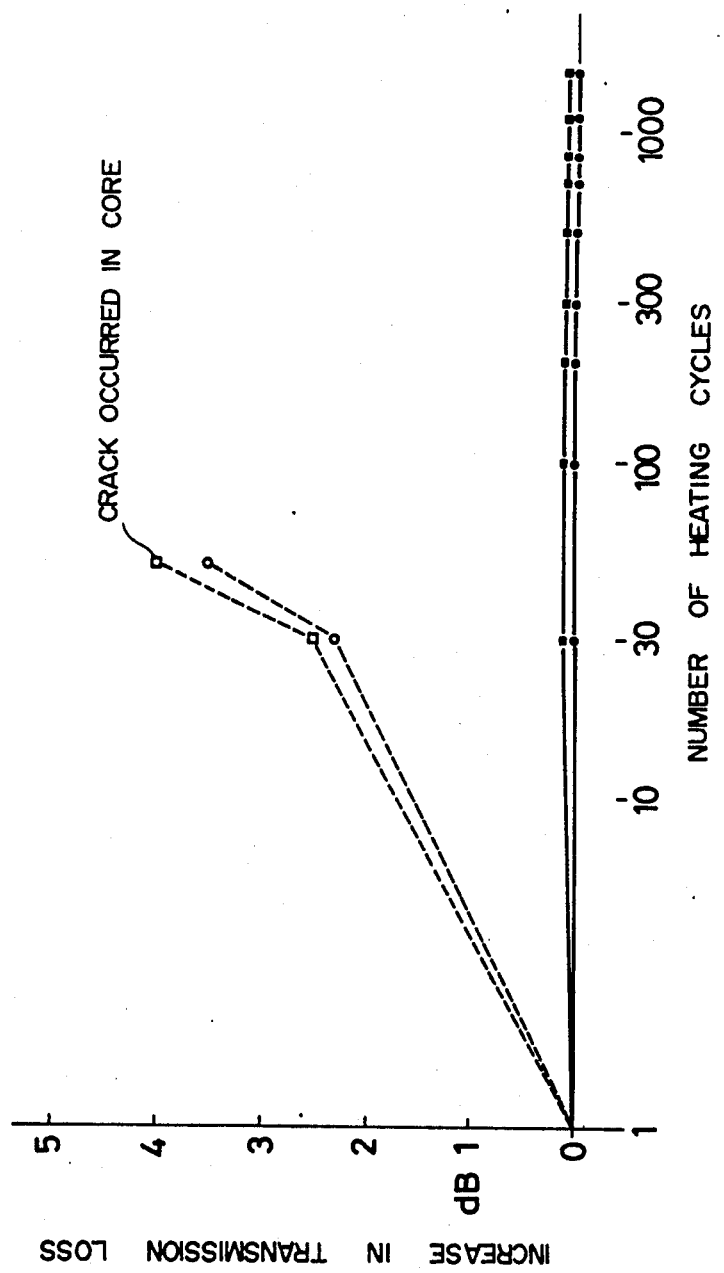

PLASTIC OPTICAL FIBER CABLE WITH FERRULE

BACKGROUND OF THE INVENTION

This invention relates to a plastic optical fiber cable with a ferrule adapted to connect an optical fiber cable through a connector to an optical device or to connect several optical fiber cables to each other.

When an optical fiber cable is connected to an optical device or optical fiber cables are connected to each other through a connector, it is in general the practice to mount a ferrule for reinforcing the end of the cable.

The ferrule is mounted when the core of the optical fiber cable is formed as a quartz optical fiber and a plastic optical fiber.

The plastic optical fiber cable is formed of a plastic optical fiber and a plastic sheath covering the outer periphery of the core in a manner known per se, and the ferrule mounted at the end of the cable is formed of plastic or metal or of a combination of plastic and metal.

A conventional example of mounting a plastic ferrule on the outer periphery of the end of the plastic optical fiber cable will be described.

The plastic sheath is first stripped at the end of the plastic optical fiber cable for a suitable length, thereby exposing the optical fiber core from the end of the cable.

Then, an adhesive is coated on the exposed part of the optical fiber cable, a plastic ferrule is engaged with the outer periphery of the part coated with the adhesive, and a clamping ring engaged with the outer periphery of the base end side of the ferrule is crimped to secure the ferrule to the end of the optical fiber cable.

Subsequently, the optical fiber cable is kept intact until the adhesive is cured. After the adhesive is cured, the end of the optical fiber cable with the ferrule is polished so that the end face of the ferrule and the end face of the optical fiber are disposed in the same plane.

On the other hand, when a ferrule formed of metal is mounted at the end of the plastic optical fiber cable, the metal ferrule and the plastic sheath may be crimped, but the metal ferrule cannot be crimped directly to the bare plastic optical fiber due to a danger to damage of the core. Therefore, the adhesive is employed in case of securing the plastic optical fiber to the metal ferrule.

Further, when the front half (terminal end) of the ferrule is formed of plastic and the rear half (base end) of the ferrule is formed of metal in combination, the terminal end of the plastic optical fiber is secured to the front half (formed of plastic) of the ferrule via an adhesive, and the terminal end of the plastic sheath and the rear half (formed of metal) of the ferrule are crimped.

In addition, the prior art of mounting a ferrule at the end of an optical fiber cable having an optical fiber core is disclosed in U.S. Pat. Nos. 4,178,063 and 4,362,356. In the U.S. patents, the ferrule is mounted at the end of the optical fiber core mainly by an adhesive or by adhesive and a clamping ring.

However, securing the ferrule to the end of the plastic optical fiber cable mainly by an adhesive takes a considerable period of time to cure the adhesive, thereby decreasing the finishing efficiency.

Further, when the clamping ring is employed as means for temporarily fastening the ferrule until the adhesive is cured, the efficiency cannot be improved due to the use of the adhesive. In addition, crimping means for indirectly crimping the clamping ring from above the ferrule provides only a weak securing force between the ferrule and the plastic optical fiber, and is not a highly reliable fastening means.

These problems arise in the ferrule mounting means which employ the adhesive irrespective of the material of the ferrule.

In view of the above-described drawbacks, plastic is desired as the ferrule for a plastic optical fiber cable, but in the case of the conventional practice which depends upon an adhesive as the means for securing the ferrule, its workability and fastening strength are not satisfactory.

SUMMARY OF THE INVENTION

It is an object of this invention to provide a plastic optical fiber cable with a ferrule which can eliminate the aforementioned drawbacks and disadvantages, in which a rigid ferrule can be mounted at the end of the plastic optical fiber cable in a short time and which does not damage the core even if a heating cycle is applied thereto.

According to one aspect of this invention, there is provided a plastic optical fiber cable with a ferrule in which the plastic sheath of the terminal end of the optical fiber cable is remved to expose a plastic optical fiber from the end of the optical fiber cable, and the ferrule is secured to the outer periphery of the terminal end of the optical fiber cable, wherein the ferrule is axially formed as a combination of a plastic cylindrical member for forming the terminal end of the ferrule, and a metal cylindrical member for forming the base end. The plastic cylindrical member is contacted with the enlarged part of the end of the optical fiber core at the inner peripheral surface of the terminal end to be secured to the end of the optical fiber core, and the metal cylindrical member is contacted under pressure with the outer periphery of the end of the plastic sheath by a stopper projecting from the inner peripheral surface of the metal cylindrical member to be fastened to the plastic sheath.

As described above, the plastic optical fiber cable with the ferrule of this invention does not employ an adhesive but fastens the ferrule to the end of the optical fiber cable. Therefore, the plastic optical fiber cable of the invention does not require as long a time to produce as the conventional optical fiber cable which requires a long curing time for the adhesive, and can improve the workability.

Further, in the plastic optical fiber cable of the invention, the plastic cylindrical member which forms part of the ferrule and the terminal end of the optical fiber core, and the metal cylindrical member which forms the other part of the ferrule and the end of the plastic sheath are fastened to each other in such a manner that the enlarged part of the end of the optical fiber core intrudes into the inner peripheral surface of the plastic cylindrical member and the stopper of the metal cylindrical member penetrates into the outer peripheral surface of the end of the plastic sheath. Therefore, the ferrule mounting state at the end of the plastic optical fiber cable is extremely rigid, and the reliability of the ferrule mounting state of the plastic optical fiber cable with the ferrule can be largely enhanced.

Moreover, part of the ferrule is formed of plastic, and corresponds to the plastic optical fiber of the plastic cylindrical member. Consequently, the optical fiber core is not affected by the influence of the heating cycle which occurs when the materials of both are different, and damage to the core when treated by a heating cycle can be accordingly avoided.

The above and other related objects and features of the invention will be apparent from a reading of the following description of preferred embodiments illustrated in the accompanying drawings.

BRIEF DESCRIPTION OF THE DRAWINGS

FIG. 11 is a graph showing the result of a thermal impact test of the optical fiber cable of the invention and a comparative sample.

DETAILED DESCRIPTION OF PREFERRED EMBODIMENTS

Various embodiments of a plastic optical fiber cable with a ferrule according to the present invention will be described in detail with reference to the accompanying drawings.

Figure 1:
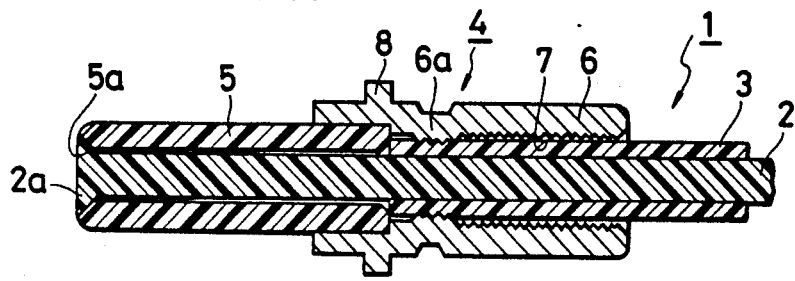
FIG. 1 is a longitudinal sectional view showing a first embodiment of a plastic optical fiber cord with a ferrule according to the present invention.
Figure 2:
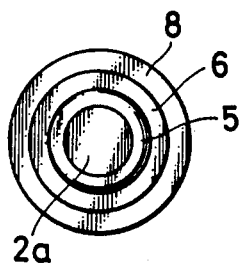
FIG. 2 is a left side view of the optical fiber cord of FIG. 1.

FIGS. 1 and 2 show a first embodiment of a plastic optical fiber cable with a ferrule of the present invention in section and left side view.

In FIGS. 1 and 2, reference numeral 1 designates a plastic optical fiber cable, which is formed of a plastic optical fiber 2 and a plastic sheath (which is also called a plastic jacket) 3 for covering the outer periphery of the core 2.

The fiber 2, consisting of a central light transmitting core and a generally cylindrical layer of cladding, is known to be used for transmitting light at a short distance. The core is formed, for example, of alkyl methacrylate resin, or polystyrene resin, the cladding is formed, for example, of fluorine-containing polymer, or alkyl methacrylate resin, and the plastic sheath is formed of thermoplastic resin.

The size of the plastic optical fiber cable 1 is, for example, 1 mm in diameter for the core and 2.2 mm of outer diameter for the sheath.

The plastic sheath 3 is removed for a suitable length from the end of the plastic optical fiber cable 1, thereby exposing the end of the plastic optical fiber 2. The end of the core 2 is enlarged in a flared shape by processing to be described later, and the end of the core 2 is formed into an enlarged part 2a.

In FIGS. 1 and 2, reference numeral 4 designates a ferrule, which is axially formed as a combination of a plastic cylindrical member 5 which forms the terminal end of the ferrule 4 and a metal cylindrical member 6 which forms the base end of the ferrule 4.

The plastic cylindrical member 5 is made of thermoplastic resin such as polyesters, and the metal cylindrical member 6 is made of metal such as aluminum or brass.

The plastic cylindrical member 5 has a bore capable of containing the end of the plastic optical fiber 2 therein, and the inner peripheral surface 5a of the end of the cylindrical member 5 is enlarged in a flared shape.

The metal cylindrical member 6 has a bore capable of containing the plastic sheath 3 of the outer periphery of the core 2 therein, spiral threads 7 are formed on the inner peripheral surface of the cylindrical member 6, and a flange is formed on the outer peripheral surface.

The end of the plastic optical fiber 2 is inserted into the plastic cylindrical member 5, and the end of the plastic sheath 3 is inserted into the metal cylindrical member 6. In this ferrule fastening state, the inner peripheral surface 5a of the end of the cylindrical member 5 is closely contacted with the enlarged part 2a of the optical fiber core 2, a stopper 6a projecting from the inner peripheral surface of the cylindrical member 6 is contacted with the outer peripheral surface of the plastic sheath 3, and the threads 7 are further pressed into the outer peripheral surface of the end of the sheath 3.

The plastic optical fiber cable with ferrule in FIGS. 1 and 2 is fabricated, for example, by means which will be described.

First, the plastic sheath 3 is stripped from the end of the plastic optical fiber cable 1, and is removed in a suitable length, thereby exposing the optical fiber core 2 from the end of the optical fiber cable.

Then, the end of the plastic optical fiber cable 1 is inserted into the ferrule 4 so that the end of the exposed optical fiber core 2 is disposed in the plastic cylindrical member 5 and the end of the plastic sheath 3 is disposed in the metal cylindrical member 6, the metal cylindrical member 6 of the ferrule 4 is then crimped by a pressing tool from the outside of the cylindrical member 6, to form a stopper 6a projecting from the inner peripheral surface of the cylindrical member, and the cylindrical member 6 is contacted under pressure with the outer periphery of the end of the plastic sheath 3.

In this case, the end of the plastic optical fiber 2 protrudes slightly from the end of the plastic cylindrical member 5. The protruding length is preferably, for example, approx. 0.1 to 1 mm.

Figure 3:
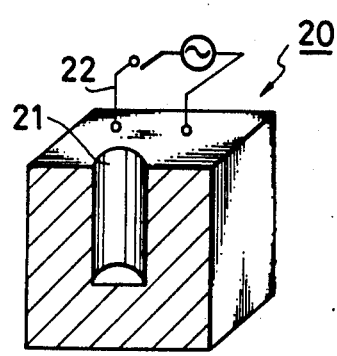
FIG. 3 is a fragmentary perspective view of a heat molding unit used for fabricating the plastic optical fiber cable with the ferrule of this embodiment.

After the metal cylindrical member 6 is crimped to the plastic sheath 3 at the end of the optical fiber cable 1, the optical fiber core 2 and the plastic cylindrical member 5 are fastened by employing a heat molding unit 20 schematically shown, for example, in FIG. 3.

The heat molding unit 20 schematically shown in FIG. 3 is, for example, formed of a metal such as aluminum. The molding unit 20 has a ferrule inserting hole 21 having a substantially equal inner diameter to the outer diameter of the terminal end of the ferrule 4 at the center thereof in such a manner that the bottom of the hole 21 is mirror-polished.

Further, a heater 22 formed of a nichrome wire is buried in the thick-walled part of the molding unit 20 through an insulator.

When the optical fiber core 2 and the plastic cylindrical member 5 are fastened by using the molding unit 20, the ferrule inserting hole 21 is held at a predetermined temperature through the heater 22, and the end of the plastic optical fiber with the ferrule is inserted into the inserting hole 21 in the temporarily clamped state.

Then, after lapse of a predetermined period of time, the protruded end of the optical fiber core 2 is heated and softened in the ferrule inserting hole 21 of the molding unit 20, and when the end of the core 2 is pressed to the bottom of the inserting hole 21 at this time, the end of the core 2 is affected by the reaction from the bottom of the inserting hole 21 to be pressure deformed, thereby forming the enlarged part 2a formed similarly to the inner peripheral surface 5a of the end of the cylindrical member 5.

In this manner, the enlarged part 2a is formed at the end of the plastic optical fiber 2, and when the enlarged part 2a is closely contacted with the end face 5a of the plastic cylindrical member 5, both are adhered to an airtight degree but they are not integrally fused together as would occur if the plastics were melted together.

When the end of the optical fiber core 2 is pressed to the mirror-finished bottom of the ferrule inserting hole 21 of the molding unit 20 as described above, the end face of the optical fiber core 2, i.e., the end face of the enlarged part 2a, is finished in the mirror-finished state.

Therefore, after the enlarged apart 2a of the optical fiber core 2 is contacted with the inner peripheral surface 5a of the end of the plastic cylindrical member 5, it is not necessary to polish the end face of the optical fiber core 2.

The essential work is thus completed, and the plastic optical fiber cable with the ferrule shown in FIGS. 1 and 2 is provided.

In the embodiment described above, when the end of the exposed optial fiber core 2 is disposed in the plastic cylindrical member 5 and the end of the optical fiber cable is inserted into the ferrule 4 so that the end of the plastic sheath 3 is disposed in the metal cylindrical member 6, it is temporarily clamped by the light crimping force applied from the outside of the plastic cylindrical member 5. When such means is employed, after the end of the optical fiber core 2 and the plastic cylindrical member 5 are fastened by the heat molding, the metal cylindrical member 6 is crimped to the outer periphery of the plastic sheath 3.

When the ferrule 4 is fastened to the end of the plastic optical fiber cable 1 by other means, a stopper 6a is formed in advance on the inner peripheral surface of the metal cylindrical member 6, the end side of the plastic optical fiber cable 1 is press-fit or spirally screwed into the ferrule 4 to engage the stopper 6a with the outer peripheral surface of the end of the plastic sheath 3, and the metal cylindrical member 6 is fastened thereby to the plastic sheath 3. The optical fiber core 2 and the plastic cylindrical member 5 may be fastened by using the molding unit 20 in the same manner as described above.

When the ferrule is fastened to the end of the plastic optical fiber cable 1 through the above means, the radial pressing force of the stopper 6a is not very large, and the transmitting characteristics of the optical fiber core 2 do not accordingly decrease.

A second embodiment of the plastic optical fiber cable of the invention will now be described in detail.

Figure 4:
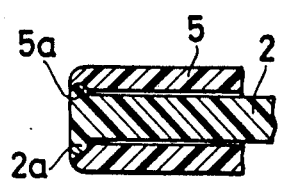
FIG. 4 is a longitudinal sectional view showing a plastic optical fiber and a plastic cylindrical member in a second embodiment according to the present invention.

In the second embodiment of the invention shown in FIG. 4, the shape of an enlarged part 2a of a plastic optical fiber 2 and the sahpe of the inner peripheral surface 5a of the terminal end of a plastic cylindrical member 5 are different from those of the first embodiment in FIG. 1.

More particularly, in FIG. 4, a recess slot of semicircular section is formed on the inner peripheral surface 5a of the end of a plastic cylindrical member 5, and the enlarged part 2a of the plastic optical fiber 2 is formed in the shape corresponding to the recess slot of the plastic cylindrical member 5.

In the embodiment shown in FIG. 4, the fastening strength between the plastic optical fiber 2 and the plastic cylindrical member 5 is larger than that of the first embodiment in FIG. 1.

Figure 5:
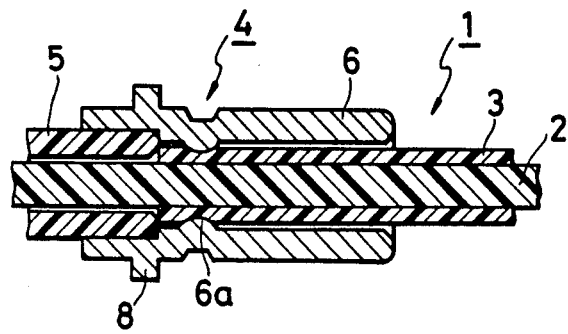
FIG. 5 is a longitudinal sectional view showing a fastening structure of the plastic sheath and a metal cylindrical member in the second embodiment of the invention.

In a third embodiment of the invention shown in FIG. 5, the shape of stopper 6a of metal cylindrical member 6 is different from that of the first embodiment in FIG. 1.

The stopper 6a of the cylindrical member 6 of FIG. 5 is formed of a ring-shaped projection, which is formed by crimping part of the metal cylindrical member 6.

The fastening strength of the plastic sheath 3 and the metal cylindrical member 6 in FIG. 1 is excellent compared to that of the third embodiment in FIG. 5, but a predetermined strength can also be provided even by the third embodiment of FIG. 5.

Further, it is noted that spiral threads may be used as the stopper 6a of the metal cylindrical member 6 to be pressed on the outer peripheral surface of the plastic sheath 3.

FIGS. 6 to 9 show various means of coupling the plastic cylindrical member 5 and the metal cylidrical member 6 in the ferrule 4.

Figure 6:
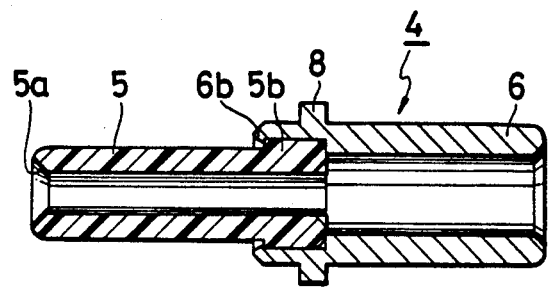
FIGS. 6 to 10 are longitudinal sectional views respectively showing variously coupled states of the plastic cylindrical member and the metal cylindrical member in the ferrule according to the invention.

In the case of FIG. 6, a stepped connection part 5b which has an outer diameter larger than the other outer periphery is formed on the rear end of the outer periphery of a plastic cylindrical member 5, and a stepped connection part 6b for holding the stepped connection part 5b is formed by crimping the end of the metal cylindrical member 6.

Figure 7:
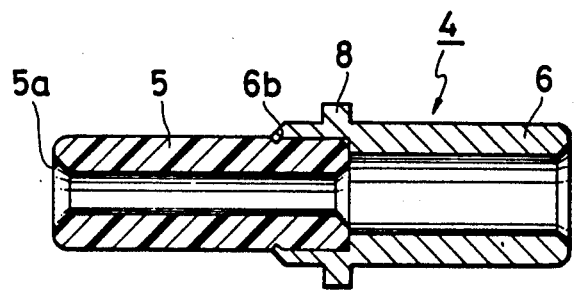

In the case of FIG. 7, a connection piece 6b for embedding into the outer peripheral surface of the rear end of plastic cylindrical member 5 (having no stepped connection part 5b) is formed at the end of a metal cylindrical member 6.

Figure 8:
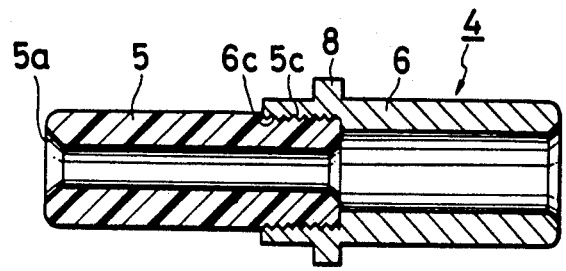

In the case of FIG. 8, a pair of male threads 5c and female threads 6c are respectively oppositely formed on the outer peripheral surface of the end of plastic cylindrical member 5 and the inner peripheral surface of the end of metal cylindrical member 6, and the cylindrical member 5 and the cylindrical member 6 are coupled by engaging via threads 5c and 6c of the cylindrical members 5 and 6, respectively.

Figure 9:
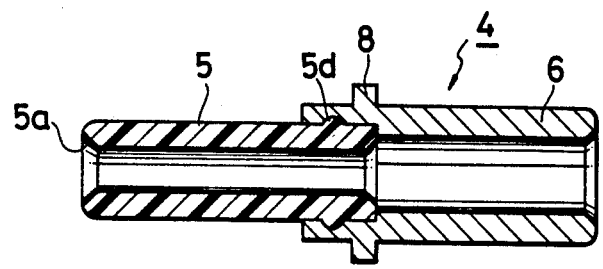

In the case of FIG. 9, an annular strip 5d is formed on the outer peripheral surface of the rear end of a plastic cylindrical member 5, and a recess is correspondingly formed on the inner peripheral surface of the end of a metal cylindrical member 6, and the strip 5d and the recess of the members 5 and 6 are engaged with each other.

In the embodiment shown in FIG. 9, the metal cylindrical member 6 is set in advance in a mold of the plastic cylindrical member 5, and the plastic cylindrical member 5 is formed by molding it in the mold.

Figure 10:
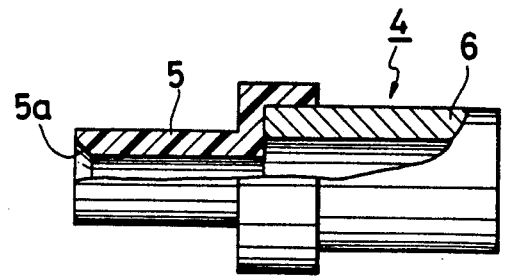

In the case of FIG. 10, the rear end side of plastic cylindrical member 5 is formed in a stepped connection part designed to surround the end side of metal cylindrical member 6, and both the members 5 and 6 are engaged by inserting the cylindrical member 6 into the rear end side of the member 5 to cover the end of the member 6 by the end of the member 5.

In the embodiment of FIG. 10, the various coupling means of FIGS. 6 to 9 may be also employed.

Further, in FIGS. 1 and 10, the plastic cylindrical member 5 and the metal cylindrical member 6 may be press-fitted, engaged by cold-shrinkage or by bonding means.

It is noted that the stopper 6a may be formed by drawing part of the metal cylindrical member 6.

The results of thermal impact tests of the plastic optical fiber cable with the ferrule will be described with reference to FIG. 11.

In FIG. 11, a solid line curve designates the result of the plastic optical fiber cable of the present invention, and curves of broken lines denote the results of the conventional plastic optical fiber cable compared with that of the invention.

The test piece of the invention is constructed as exemplified in FIG. 1.

In case of the conventional optical fiber cable compared as a sample, the structure of the plastic optical fiber cable with ferrule is similar to that shown in FIG. 1, but the ferrule at the end of the optical fiber cable is formed not only of the cylindrical member 6, but of metal cylindrical member 5 in such a manner that the cylindrical members 5 and 6 are integrally formed.

The plastic optical fiber cables of the present invention and the conventional one had a 1 mm diameter optical fiber core, and a 2.2 mm of outer diameter plastic sheath.

The thermal impact test is executed by repeating one cycle of a heating cycle having −40° C. to +85° C. of temperatures (one cycle/2 hours).

As apparent from FIG. 11, even if the number of heating cycles exceeds 1000, an increase in the transmission loss of the optical fiber cable of the invention practically does not occur, but occurred to a great extent in case of the conventional sample compared when the number of the heating cycles was less than 100, and damage occurred at the end of the conventional optical fiber core.

In the case of the conventional sample compared which was constructed so that the entire ferrule is formed of metal, specific phenomenon occurred due to the difference of thermal expansion coefficients between the ferrule and the plastic optical fiber, and a damage in the core and the increase in the transmitting loss occurred due to this.

More particularly, when the optical fiber cable already provided with the ferrule was treated by the heating cycles, the core tended to projects from the end face of the ferrule due to the difference of the thermal expansion coefficients, and burying phenomenon frequently occurred.

When the core projects from the end face of the ferrule, the projected core collides with the opposing core to be connected, and an increase in the transmission loss and damage to the core occurred. On the contrary, when the core is buried in the end face of the ferrule, the matching of both cores in a connected state is lost, and unreasonable force acts on the core, thereby resulting in an increase in the transmission loss and damage to the core.

According to the present invention as described above, the plastic optical fiber cable with the ferrule of the invention is fastened with the ferrule at the end of the optical cable without using an adhesive. Therefore, the working time for fabricating the optical fiber cable with the ferrule can be shortened. Since the cylindrical member corresponding to the plastic optical fiber of the invention is formed of plastic, detrimental influence in the transmitting characteristics of the optical fiber cable due to the heating cycles does not occur. Since the enlarged part of the end of the optical fiber core intrudes into the inner peripheral surface of the end of the plastic cylindrical member and the stopper of the metal cylindrical member penetrates into the outer peripheral surface of the end of the plastic sheath and they are fastened to each other in this manner, the ferrule mounting state at the end of the plastic optical fiber cable of the invention becomes remarkably rigid, thereby providing the plastic optical fiber cable with the ferrule in a highly reliable manner.

What is claimed is:

1. A terminated plastic optical fiber cable, comprising:

an optical fiber cable comprised of a plastic optical fiber core surrounded by a protective sheath, wherein at one terminal end of the optical fiber cable the protective sheath is removed to expose a predetermined length of the optical fiber core; and a composite ferrule coaxially surrounding the terminal end of the optical fiber cable, said ferrule comprising (i) a hollow plastic cylindrical member having an axial bore, said plastic cylindrical member axially surrounding and having a length substantially equal to said predetermined length of exposed optical fiber core, said plastic cylindrical member having at its end corresponding to the terminal end of the optical fiber cable a recess formed by an enlarged portion of said axial bore, and (ii) a hollow metallic cylindrical member having an axial bore and being joined axially to said plastic cylindrical member and axially surrounding a length of the optical fiber cable, said metallic cylindrical member including a projection in its axial bore which penetrates the protective sheath on said optical fiber cable to axially secure said optical fiber cable in said metallic cylindrical member, wherein the terminal end of said optical fiber core comprises an enlarged end portion which is flush with the end of said plastic cylindrical member and which extends into said recess to secure the end of said optical fiber core to the end of said plastic cylindrical member.

2. An optical fiber cable as claimed in claim 1, wherein said projection is positioned axially near to the junction point of said plastic cylindrical member and said metallic cylindrical member.

3. An optical fiber cable as claimed in claim 1, wherein the axial bore of said plastic cylindrical member has a diameter substantially equal to that of said optical fiber core.

4. An optical fiber cable as claimed in claim 1, wherein said enlarged end portion and said recess have complementary shapes and wherein said enlarged end portion extends into said recess in a sealed relationship.

5. A plastic optical fiber cable according to claim 1, wherein the enlarged end portion of said optical fiber core has a flared head shape enlarged toward the end opening of said plastic cylindrical member, and the enlarged portion and said plastic cylindrical member are closely contacted with each other.

6. A plastic optical fiber cable according to claim 5, wherein the enlarged end portion of said optical fiber core and said plastic cylindrical member are made to have complementary shapes with each other by a heating step.

7. A plastic optical fiber cable according to claim 1, wherein the enlarged end portion of said optical fiber core has a head shape rounded at its outer peripheral surface, and the enlarged portion and said plastic cylindrical member are closely contacted with each other.

8. A plastic optical fiber cable according to claim 7, wherein the enlarged end portion of said optical fiber core and said plastic cylindrical member are made to have complementary shapes with each other by a heating step.

9. A plastic optical fiber cable according to claim 1, wherein the projection from said metallic cylindrical member comprises threads in wavy section, and the threads are contacted under pressure with said protective sheath.

10. A plastic optical fiber cable according to claim 9, wherein the projection is crimped into contact with said protective sheath.

11. A plastic optical fiber cable according to claim 1, wherein the projection from said metallic cylindrical member comprises a ring-shaped projection, and the projection is contacted under pressure with said protective sheath.

12. A plastic optical fiber cable according to claim 11, wherein the projection is crimped into contact with said protective sheath.

13. A plastic optical fiber cable according to claim 1, wherein the projection from said metallic cylindrical member comprises a spiral strip, and the strip is contacted under pressure with said protective sheath.

14. A plastic optical fiber cable according to claim 13, wherein the projection is contacted by threading with said protective sheath.

15. A plastic optical fiber cable according to claim 1, wherein the projection is caused to penetrate the protective sheath by threading with said protective sheath.

16. A plastic optical fiber cable according to claim 1, wherein said plastic cylindrical member and said metallic cylindrical member are engaged with each other.

* * * * *